Oct. 3, 1967    S. E. TAYLOR    3,344,709
AUDIO-VISUAL INSTRUCTIONAL APPARATUS
Filed Nov. 6, 1964    8 Sheets-Sheet 1
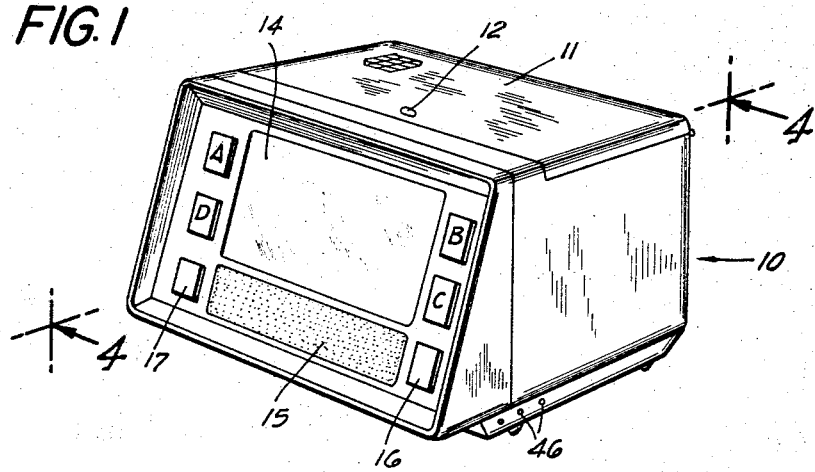
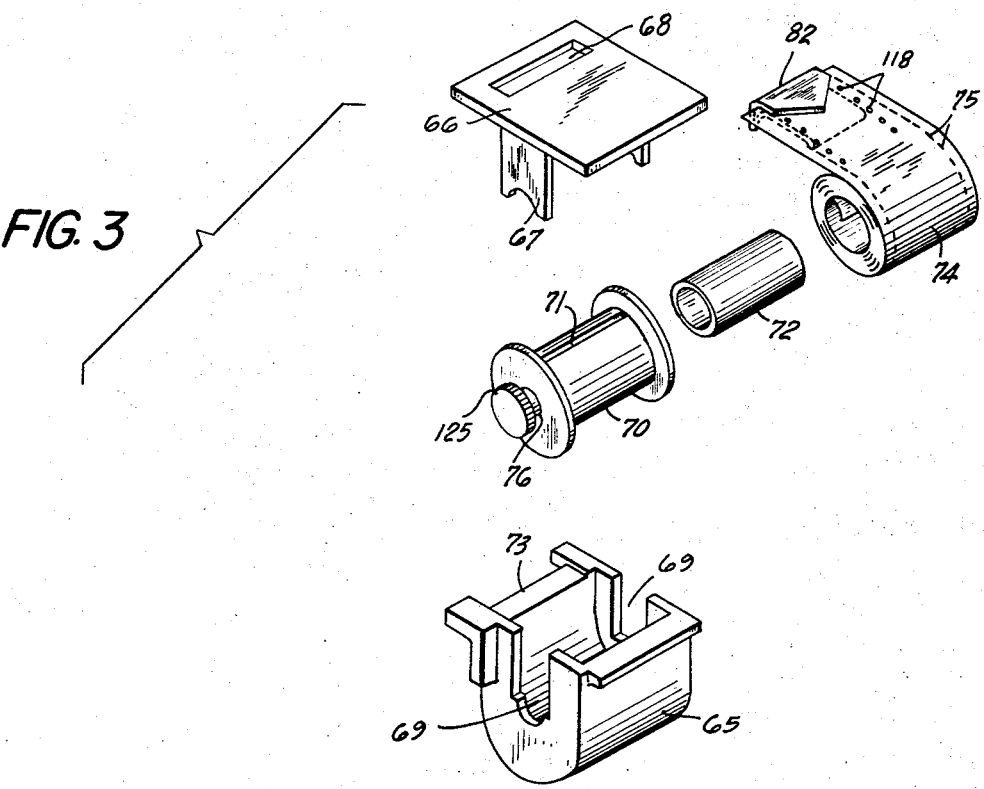
INVENTOR
STANFORD E. TAYLOR
BY
Kane, Dalsimer & Kane
ATTORNEYS Oct. 3, 1967  S. E. TAYLOR  3,344,709
AUDIO-VISUAL INSTRUCTIONAL APPARATUS
Filed Nov. 6, 1964  8 Sheets-Sheet 2

INVENTOR
STANFORD E. TAYLOR
BY
Kane, Dalsimer & Kane
ATTORNEYS

INVENTOR
STANFORD E. TAYLOR
BY
Kane, Dalsimer + Kane
ATTORNEYS

Oct. 3, 1967  S. E. TAYLOR  3,344,709
AUDIO-VISUAL INSTRUCTIONAL APPARATUS
Filed Nov. 6, 1964  8 Sheets-Sheet 5

INVENTOR
STANFORD E. TAYLOR
BY
Kane, Dalsimer & Kane
ATTORNEYS

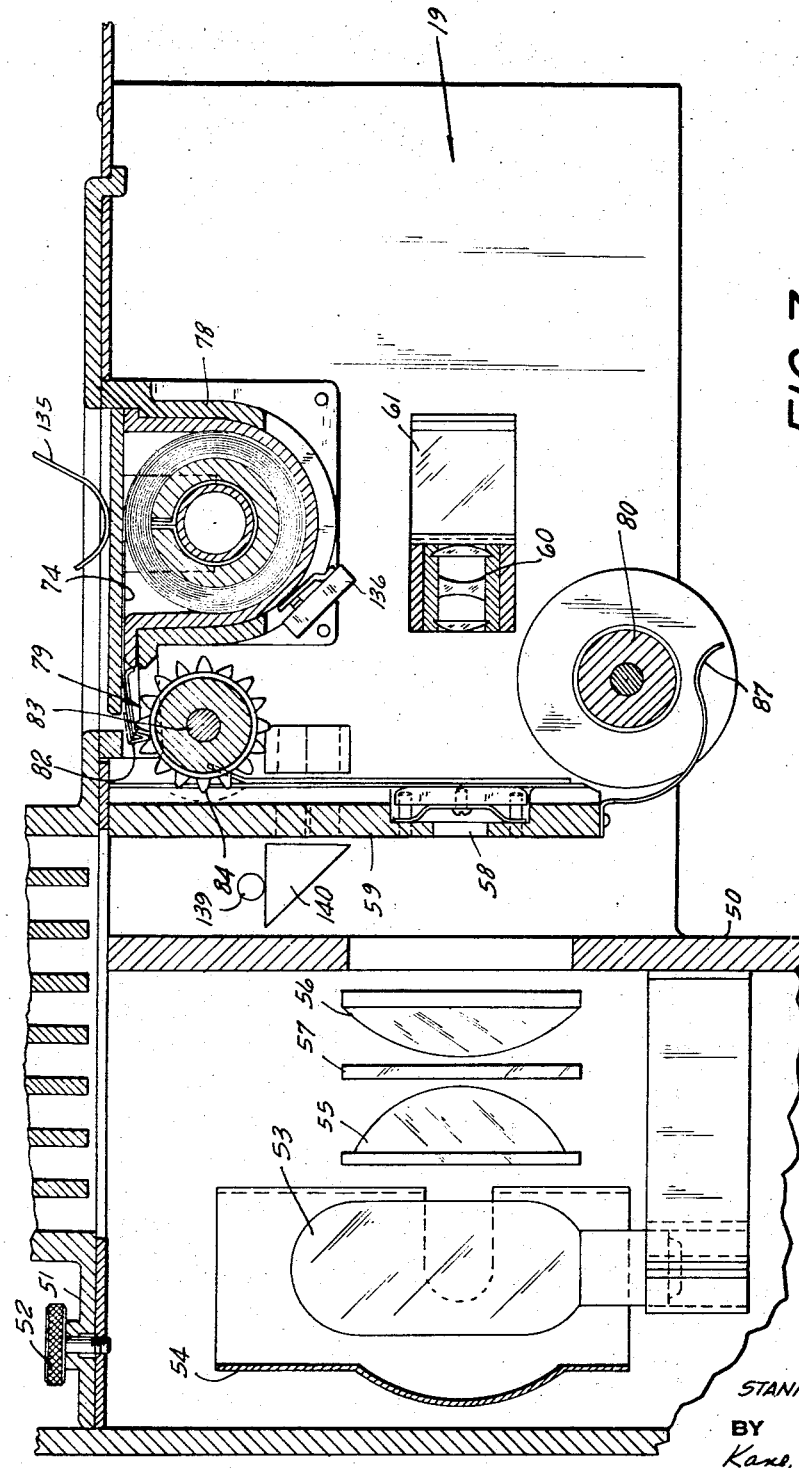

Oct. 3, 1967 S. E. TAYLOR 3,344,709
AUDIO-VISUAL INSTRUCTIONAL APPARATUS
Filed Nov. 6, 1964 8 Sheets-Sheet 7

INVENTOR
STANFORD E. TAYLOR
BY
Kane, Dalsimer & Kane
ATTORNEYS

3,344,709
AUDIO-VISUAL INSTRUCTIONAL APPARATUS
Stanford E. Taylor, Hawk Drive,
Lloyd Harbor, N.Y.
Filed Nov. 6, 1964, Ser. No. 409,412
10 Claims. (Cl. 88—28)

This invention relates to an improved audio-visual apparatus for use as an instructional and educational aid.

It is a primary object of the present invention to provide improvement apparatus of the above character which is versatile and flexible and can be used simply either as an audio or as a visual aid, or which can be operated as a combined audio-visual aid and which also makes provision for the participation of the student in a variety of different manners as by aural recording, selecting, writing or reciting responses to problems or instructional situations presented. In this connection, my invention provides an improved bi-sensory learning device and method which has the capability of simultaneously stimulating both the auditory and visual centers of the brain. This double sensory impact produces a synergistic effect upon the learner and greatly accelerates the learning process through intensified inductive association.

I have also found that my apparatus and method are particularly helpful to a beginning reader as a means for acquiring a sight vocabulary, necessary for reading in his native or a secondary language. With the simultaneous presentation of the word in both sight and sound, the learner may readily associate the sound of words with which he is orally familiar, to their printed form.

Because a printed word can be presented at intervals as part of aural context, the beginning reader can more fully grasp and appreciate the meaning or function of the word presented and thus will be facilitated in his retention of the graphic impression of the word as a significant and useful linguistic element.

Further, the isolated presentation of a printed word eliminates any possibility of conflicting retinal impressions as the viewer moves his eyes on and around the word as he naturally does in the process of identifying and recognizing a word.

A further object of my invention is the provision of improved audio-visual apparatus of the above character in which the audio unit may be used for automatically controlling the visual unit so that the visual images displayed may be coordinated with or controlled by sound recordings.

Another object of my invention is the provision of an improved shutter arrangement for filmstrip projectors in apparatus of this type whereby the appearance and duration and disappearance of the projection of the visual image may be readily and automatically controlled.

Other objects include the provision of improvements useable with apparatus of this type, such as simplified automatic film threading and take-up apparatus, simplified controls for automatically rewinding film, automatic controls for preventing the operation of a record-player when a record is not in place and for preventing the operation of a projector when it is not loaded with a film cartridge, and the use of photo-electric cells in association with light shield tracks on the film for automatically controlling and varying different operations and functions of the apparatus in coordination with the instructional program being presented.

In carrying out my invention I provide apparatus having a sound-reproducing unit for playing recordings and a film-projecting unit arranged so that each can be separately operated and so that they can be operated simultaneously or in coordinated relationship with the sound-reproducing unit automatically controlling the film-projecting unit in response to signals from the recordings. The apparatus may also embody an improved film-threading and winding apparatus using magnetically attractable members on the film and a magnetic take-up roll which permits automatic threading and handling of the film. My invention also incorporates improved automatic controls for preventing the operation of the sound reproducer when a recording is not in place, for preventing the operation of the projector when the film cartridge is not in place, and for automatically rewinding the film when the cover of the apparatus is opened. I also contemplate using light sensitive elements on the opposite side of the film from the projector so that light-shielding tracks on the film may be utilized to automatically determine certain operations through the light-sensitive controls.

In th accompanying drawings:

FIG. 1 is a perspective view of audio-visual apparatus embodying my invention;

FIG. 2a is a detailed fragmentary view showing the mechanism for advancing the film, rewinding the film and operating the occluding lens or shutter;

FIG. 2b is a detailed fragmentary view of the opposite side of the right hand end of the mechanism shown in FIG. 2a, particularly showing the mechanism for rewinding the film;

FIG. 2c is an exploded view in perspective of the light source and prism used in connection with the photo-electric cells;

FIG. 7 is a sectional view on an enlarged scale in the direction of the arrows on the line 7—7 of FIG. 5 showing the film-projecting mechanism;

Figure 2:
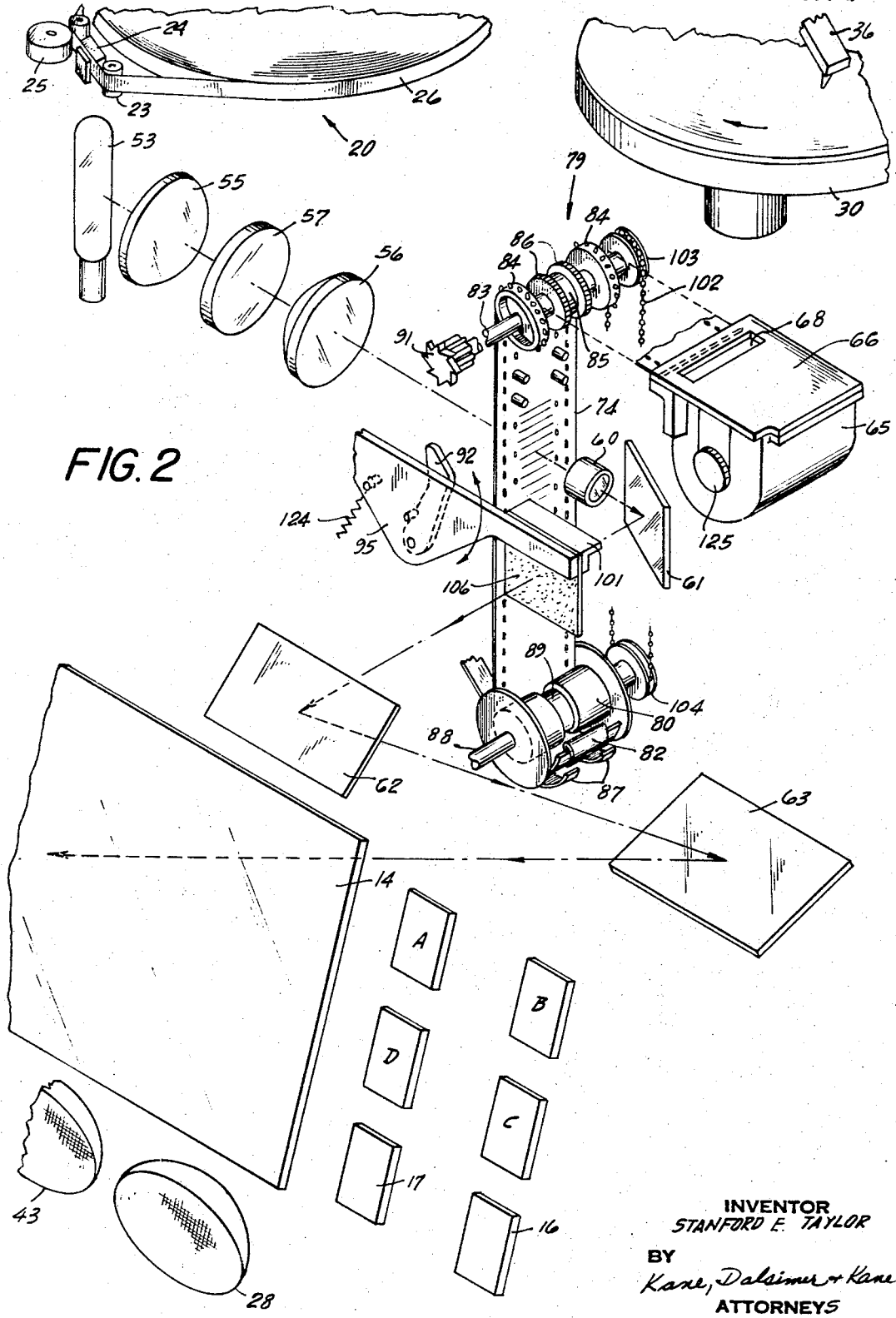
FIG. 2 is an exploded view in diagrammatic form and partially fragmentary showing the important operating mechanism forming my apparatus.

My improved apparatus may be incorporated in a suitable casing as shown at 10. The casing is of generally rectangular configuration and has a cover 11 with a finger opening 12 near its forward end to facilitate opening the cover. The cover is hinged to the rear wall which is releasably secured to the side walls by suitable means such as screws. Most of the operating parts are secured to the rear wall and cover and thus this assembly can be removed as a unit for repair and inspection.

The front wall of the casing is preferably disposed at an angle as shown and it incorporates a rear-projection screen 14 of plastic or ground glass on which visual images can be displayed.

A microphone and a speaker are positioned in back of a porous screen panel 15 located immediately beneath the rear projection screen 14.

A plurality of buttons for operating switches for controlling the apparatus are also mounted on the front face of the apparatus thus button 16 operates the start switch for initiating the operation of the audio-visual apparatus. Button 17 operates a switch for controlling the operation of the recording unit.

Buttons A, B, C and D can be depressed in response to multiple choice questions and each of these buttons operates a switch tied in with the circuitry so as to indicate whether or not the proper response was selected.

Figure 4:
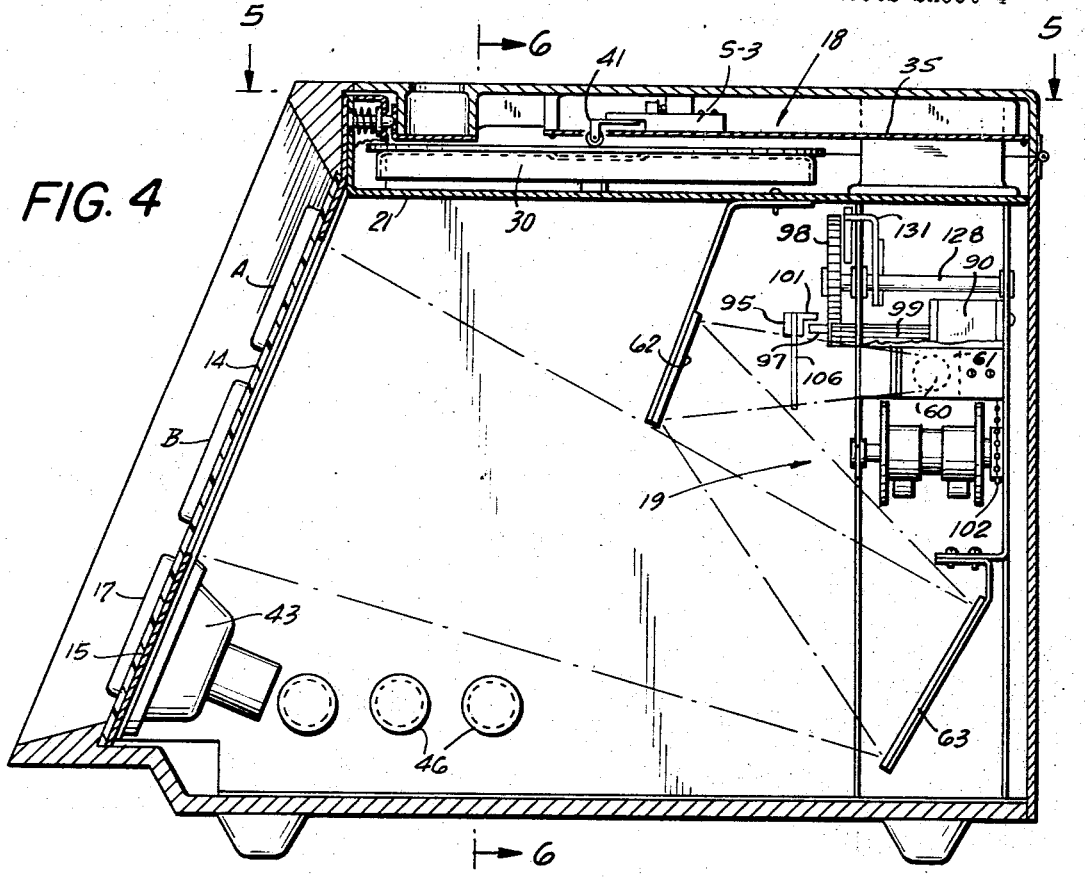
FIG. 4 is a cross-sectional view in the direction of the arrows on the line 4—4 of FIG. 1.
Figure 9:
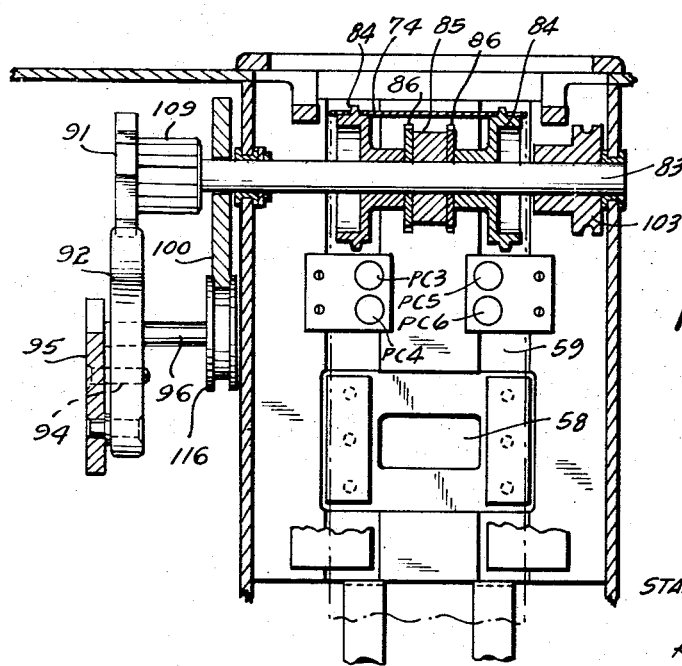
FIG. 9 is a fragmentary sectional view of a portion of the film-feeding mechanism and showing the aperture.
Figure 5:
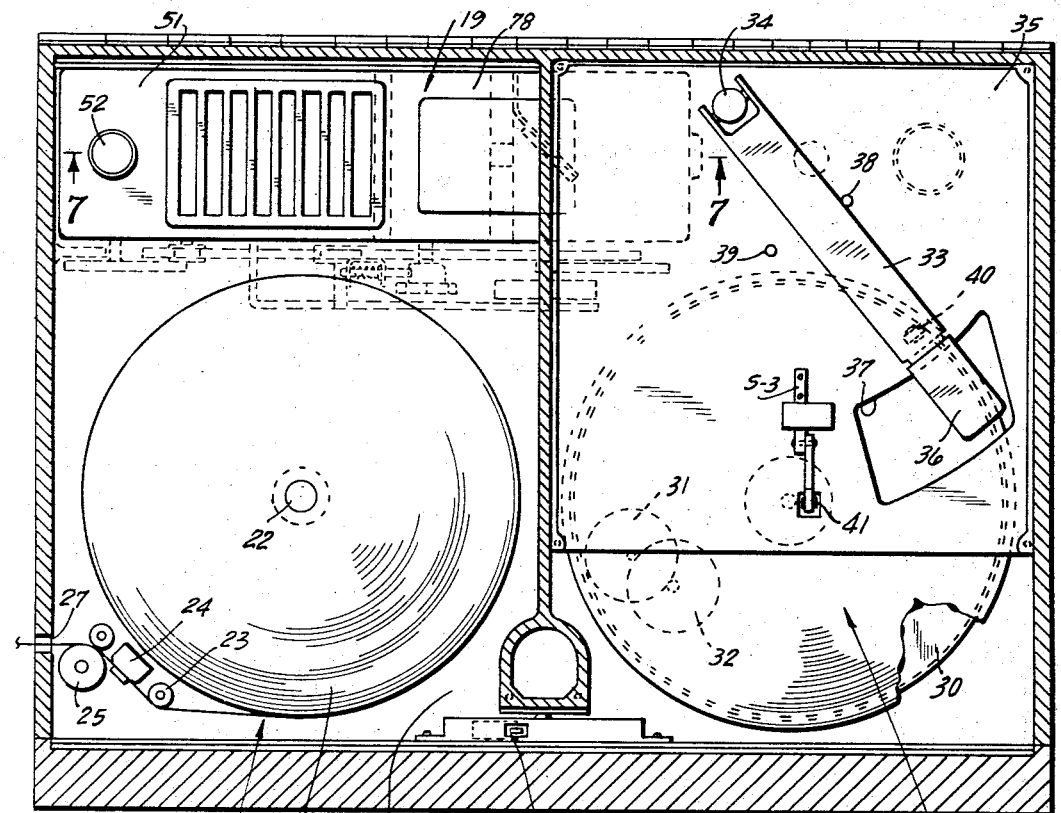
FIG. 5 is a sectional plan view in the direction of the arrows on the line 5—5 of FIG. 4.
Figure 8:
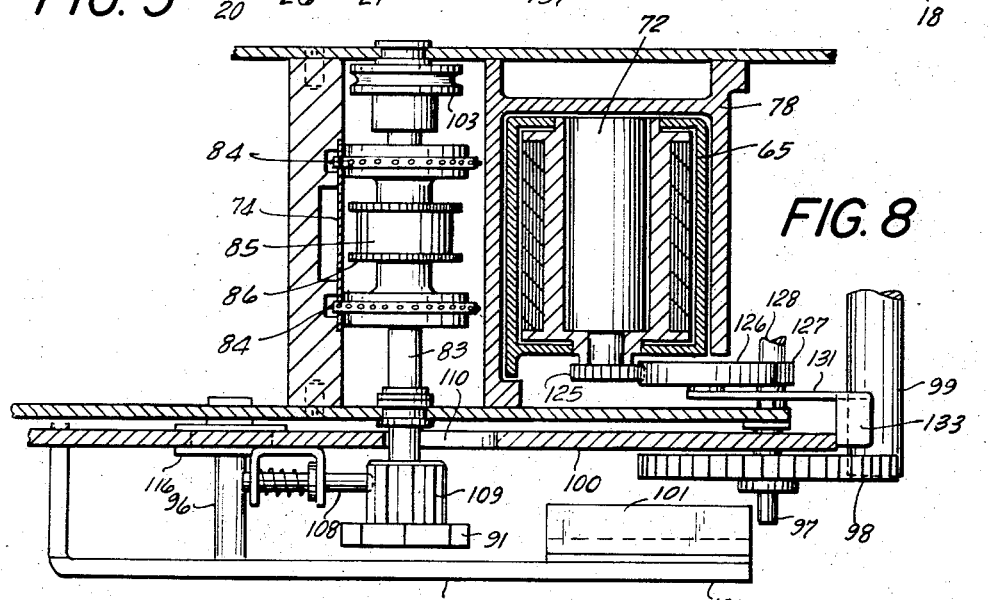
FIG. 8 is a sectional plan view in the direction of the arrows on the line 8—8 of FIG. 6 showing the film cartridge and film-feeding mechanism.

Inside the casing, I provide a sound-reproducing unit shown generally at 18, a film-projecting unit shown generally at 19 and a tape-recording unit shown generally at 20 (see FIGS. 4 and 5).

The tape recorder 20 may be of conventional construction thus it may comprise a spindle 22 mounted on the panel 21 which forms the top of the chassis. A roll of magnetic recording tape shown at 26 is placed on the spindle 22 and the tape is then threaded over the guide rollers 23 and over the face of the magnetic recording head 24 and thence around the capstan 25 which is motor-driven to feed the tape at an accurate and uniform rate of speed. The tape may then be fed outwardly from the case through a slot 27 in the side wall thereof and may be torn off and stored for playback and checking or wound on a take-up roller for future playback and checking. The microphone for the recording system is positioned behind the porous panel 15 and is indicated in the circuit diagram of FIG. 12 by the numeral 28.

The button 17 on the face of the enclosure actuates the switch for controlling the circuits of the recording system and of the capstan motor for feeding the tape.

Figure 12:
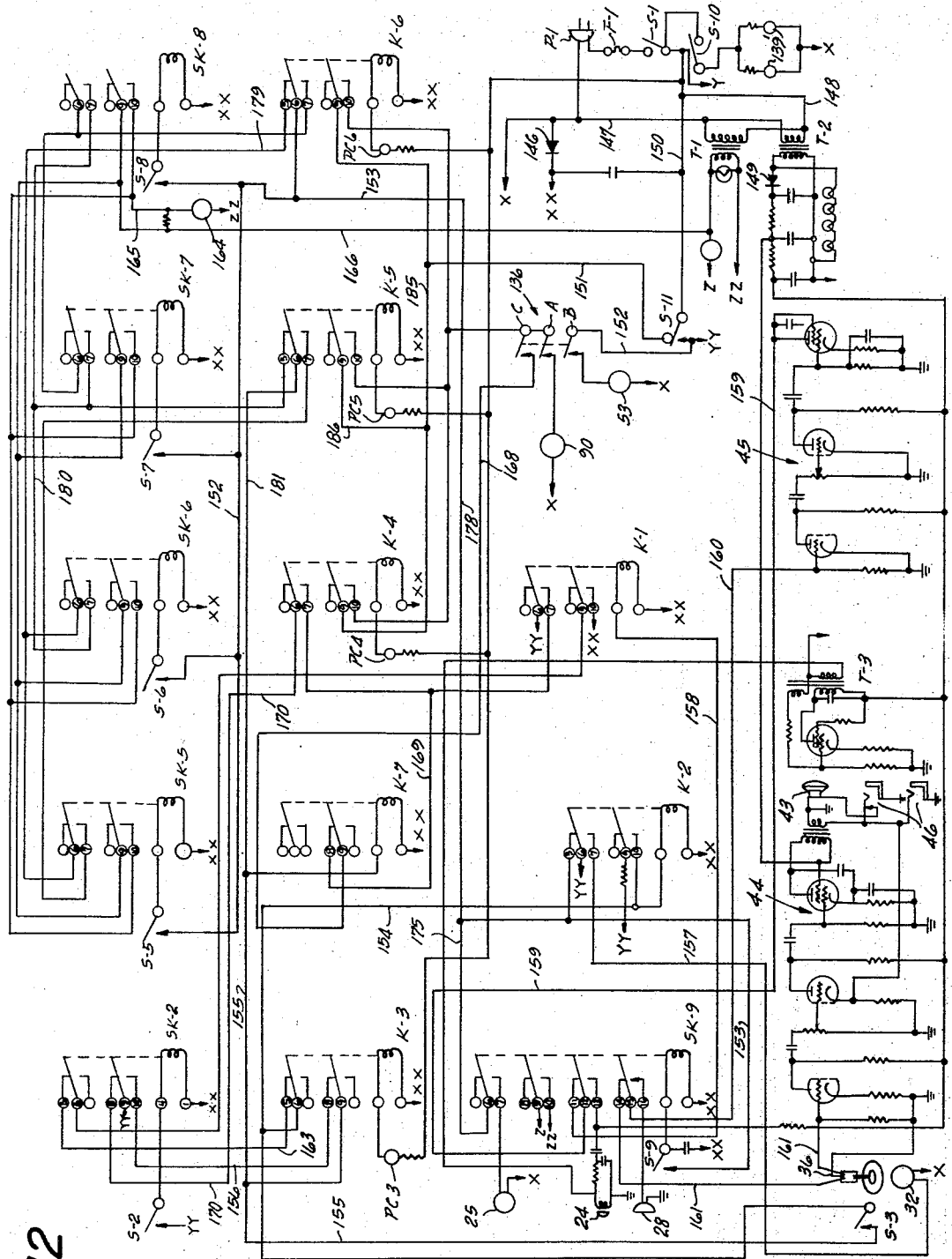
FIG. 12 is a circuit diagram showing one form of electrical circuit that may be used in my apparatus.

In FIG. 12, the recording switch which is operated by the recording button 17, is shown at S–9, and it will be seen that upon closing the switch, relay SK–9 is energized so as to operate switches completing the circuits to microphone 28, to tape-recording head 24 and to capstan motor 25.

The specific sound reproducer 18 shown in the accompanying drawings is a disc record-player. It should be understood that other types of sound reproducers such as tape and sound track players may also be employed. The sound reproducer is shown most clearly in FIGS. 5 and 6. It comprises a turntable 30 mounted for rotary motion on a spindle supported on top plate 21. The turntable is caused to rotate in the usual manner by puck 31 engaging the inner periphery of the rim of the turntable and driven by motor 32.

Tone arm 33 is pivotally mounted on spindle 34 so that it can be raised and lowered and so that it can oscillate laterally to track the record groove. The assembly of spindle 34 and tone arm 33 is mounted on tone arm cover plate 35. The tone arm cover plate is secured to the cover 11 in spaced relationship beneath the cover as shown most clearly in FIGS. 4 and 6. The lateral movement of tone arm 33 is limited by the two pins 38 and 39 mounted on cover plate 35 in spaced relationship on opposite sides of the tone arm.

The outer or free end of the tone arm is provided with a pickup head 36 carrying a stylus which projects downwardly therefrom in the usual manner. The stylus is exposed through the window opening 37 formed in cover plate 35. The opening 37 is of sufficient size to provide for the entire tracking movement of the tone arm. Thus, the stylus of the pickup head projects downwardly through window opening 37 and engages with the groove of the record which is disposed on the turntable 30.

It will be seen that when the cover 11 forming the top of the enclosure is raised, as for instance when it is desired to change the record, the tone arm will automatically, under the action of gravity, rotate or shift into engagement with the pin 38. When the tone arm is in engagement with pin 38, it is positioned at the beginning of its tracking path and the stylus will engage the beginning of the record groove of a record placed on the turntable. Thus the opening of the cover causes the tone arm to automatically shift to its initial operating position. In this connection, it will be seen that the pin 39 is so located that even when the tone arm is in engagement with the pin 39 and the cover is raised the tone arm will be disposed at an angle to the vertical plane so that it will automatically shift under the action of gravity into engagement with the pin 38. To facilitate this automatic shifting of the tone arm to its original operating position under the force of gravity the forward end thereof is preferably supported by a suitable roller 40 which rides on the upper surface of the cover plate 35.

I also provide a sensing switch for sensing the presence or absence of a record disc on the turntable. This may take the form of a microswitch S–3 mounted on the upper surface of the tone arm cover plate 35 and having a sensing arm 41 projecting outwardly and downwardly therefrom and terminating in a roller for engaging the upper surface of the record. When there is no record on the turntable the roller and sensing arm drop downwardly opening the microswitch. When there is a record present on the turntable, the roller and sensing arm 42 are shifted upwardly, closing the microswitch. The sensing switch is used to prevent the operation of the sound reproducer if there is no record in place.

The sensing switch S–3 is shown in FIG. 12. When it is closed, it places the phonograph motor in a ready condition.

The starting switch for actuating the circuits of the entire mechanism is indicated in FIG. 12 by the numeral S–2. This switch is actuated by start button 16.

In using the audio unit of my improved apparatus the cover 11 is raised with the result that the tone arm automatically shifts to its starting position in engagement with pin 38. A record disk is placed upon the turntable and the cover is lowered to closed position. If a record is in place, the record-sensing switch S–3 will be closed by the arm 41 sensing the record. If a record is not in place, the switch S–3 will remain open. If a record is in place and if the micro-switch S–3 is actuated and closed, then the operation of the sound reproducer can be initiated by first closing the power switch shown in FIG. 12 at S–1 and thereafter actuating starter switch S–2 by pressing the start button 16.

The record disks employed may contain educational and instructional material. The instructional material may from time to time require the student to make responses. The intervals between responses may vary in length. At times, they may be relatively brief and other times, they may be relatively long. Similarly, the responses themselves may vary in length. The nature of the responses may also vary. Thus, at times the student might merely give verbal responses and subsequent information given to the student, either through the audio or the visual system, will advise him whether or not his response was correct. At other times, the student might write his responses on paper. Under still other circumstances, the student may record his response. To do this, he presses the record button 17 which in turn actuates the recording switch S–9. The student may now recite his responses into the microphone 28 and these responses will be recorded on the magnetic recording tape. The operation of the recording button and switch results in switching the audio system to standby. So long as the button 17 is depressed, the recording system remains actuated and the response may be recorded. When the button 17 is released, the recording ceases. To restart the player, the starting button 16 is again pressed to actuate start switch S–2 and thereby re-initiate the operation of the sound reproducer motor and amplifier.

In addition to the instructional material, a disk recording used with my apparatus preferably includes an inaudible pulse signal and this pulse signal may be utilized to stop the operation of the sound-reproducing unit or it may be used to control the operation of the visual unit. Thus, it may be used to advance the film strip in the projector and also to control the operation of the shutter or occluding lens for preventing or permitting the display of a visual image on the screen.

The recording may be of the two channel stereophonic type with one channel carrying the educational and instructional sound track which is audibly reproduced through the loudspeaker 43. The other channel of the stereophonic recording may contain the inaudible pulse signal. With this in mind, the pickup head 36 should be of the stereophonic type. As shown in FIG. 12, one of the channels of the pick-up head should be connected to audio-amplifier 44 and the other channels should be connected to pulse amplifier 45.

Figure 11:
FIG. 11 is a detailed sectional view showing a two channel sound track of a record disk of the type that may be used herein.

In FIG. 11, I have shown a detailed, sectional, fragmentary view of a portion of a record disk having a two-channel record groove indicated as channel A and channel B respectively. Channel A is the sound track and carries the audio modulations which ae translated into sound through the audio amplifier 44 and the loudspeaker 43. Channel B carries the inaudible pulse signal modulations which are amplified by the pulse amplifier 45 to energize the relay K–1. When relay K–1 is energized, it operates the switches in association therewith and these can be utilized to advance the film strip to the next frame and to shift the occluding lens or shutter so as to expose the image. Also, under proper conditions of one of the control photo-electric cells, the pulse signal can be utilized so as to break the circuit and stop the operation of the phonograph motor 32.

As pointed out above, sound from the audio-amplifier 44 emanates from the loudspeaker 43. In addition to the loudspeaker, headsets or earphones may also be used and, for this purpose, I have provided jacks 46 on each side of the casing to which a plug for headsets or earphones may be connected. The jacks are connected to the amplifier 44.

The projector or visual mechanism is shown primarily in FIGS. 2 to 4 and 6 to 10 inclusive. It comprises a film projector assembly and a series of mirrors for projecting the image on screen 14.

The projector incldes a housing assembly 50 having a removable cover 51 held in place by a thumb screw 52 so that the cover can be removed to give access to the projection lamp and condensing lenses. It also includes the projection lamp 53 removably mounted in a socket and having the usual reflector 54 for directing a light beam through a condensing lens assembly consisting of condensing lenses 55 and 56 having heat filter 57 interposed therebetween.

The beam is then directed through film aperture 58 formed in film guide 59 and thence through an objective lens assembly 60 which serves to focus the image from the film frame exposed through aperture 58 at a predetermined point beyond the aperture. The beam is then directed to angularly disposed mirror 61 which reflects it to mirror 62 where it is reflected to mirror 63 which in turn directs the beam onto rear projection screen 14. The image is focused upon the screen so that the picture or image is seen from the face of the screen. As most clearly shown in FIG. 4, the mirrors 61, 62 and 63 are suitably supported by brackets mounted on the chassis or casing 10.

Figure 3:
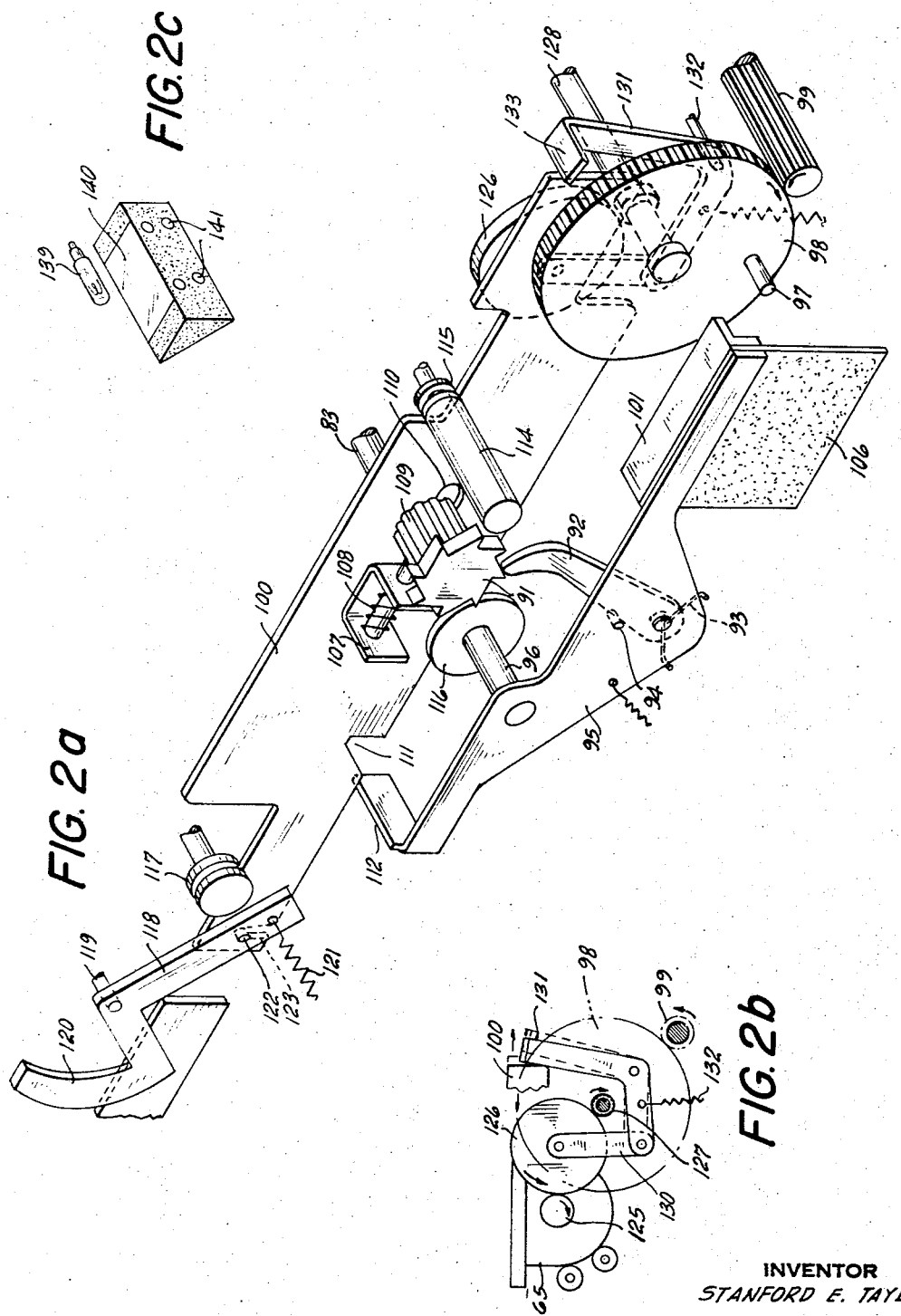
FIG. 3 is an exploded view in diagrammatic form showing the operating parts of my improved film cartridge.

The film cartridge and the film feeding and guiding mechanism is most clearly shown in FIGS. 2 to 3 inclusive and 7, 8 and 9.

The film is preferably provided in cartridge form. The cartridge has an outer casing 65 with a cover 66 removably applied thereto and frictionally held in place by the depending arms 67 which frictionally engage the sides of the casing 65. A window opening 68 is provided in the cover of the cartridge whereby the contents of the cartridge can be observed. Casing 65 is provided with a pair of slotted openings 69 on opposite sides thereof which cooperate with the arms 67 of the cover so that when the cover is assembled with the casing, a pair of apertures appear at opposite sides of the casing for receiving the stub shafts of the film spool.

The film spool is of hollow or tubular construction with a central cylindrical portion and a pair of flanges at the opposite sides thereof. A transverse slot 71 extends through the cylindrical portion of the spool from the outer surface to the inner surface and the inner end of the film is extended therethrough. A locking clip or tube 72 having a tight frictional fit with the inner surface of spool 70 is inserted therein so as to anchor the inner end of the film between the inner surface of the spool and the outer surface of the locking tube.

In assembling one of my film cartridges, the inner end of a film strip is inserted through slot 71 and anchored between the retaining tube 72 and the inner surface of spool 70. The film strip is then wound on the spool and inserted in casing 65 with its two stubshaft end portions extending through the slots 69 on opposite sides. The leading end of the film strip is extended outwardly through the recess 73 provided at the forward upper edge of casing 65 and cover 66 is assembled with the casing. The film strip 74 is provided with the usual sprocket openings 75 and it can be fed through standard film-feeding mechanism. The film strip can be rewound upon the spool in the casing by means of stubshaft 76 projecting outwardly through one of the slotted openings 69 on the side of the casing and having toothed or knurled wheel at the outer end thereof.

A cartridge well 78 is provided on the upper surface of the casing near the central portion of the rear thereof and the cartridge is inserted therein and the film is fed outwardly from the casing by the feed assembly 79, and is thence fed downwardly through the film guides 59, past the aperture 58 and is finally wound up on a take-up roll or spool 80.

The threading and feed mechanism is of a novel automatic type and for this purpose I provide co-operating magnetic means at the leading end of the film strip and on the feed assembly and the take-up roll. Thus, I provide a clip 82 at the leading end of the film strip and this clip is made of a magnetically attractable material, preferably a material with high magnetic attraction such as iron or alloys thereof.

The feed assembly 79 comprises a rotatable shaft 83 having the usual sprocket wheels 84 mounted thereon for engaging the sprocket openings 75 along the side of the film strip so as normally to feed the film strip from the cartridge through the film guides to the take-up roll. In order to automatically thread the film strip through the projection apparatus, I provide on the same shaft 83 a cylindrical permanent magnet 85 adjacent the central portion of the shaft and having a gear or toothed wheel on the two sides thereof. When the film cartridge is placed in the well 78, the leading end of the film strip projects outwardly therefrom and the clip 82 of magnetic material will be attracted by the permanent magnet 85 with the result that the lip or flange 82' at the forward edge of the clip will be pulled against the toothed gears 86. When the gears rotate, they will pull the clip and film strip forwardly until the sprocket openings in the film engage with the prongs of the sprocket wheels 84. The film will then be advanced by the sprocket wheels. The leading end of the film strip will then be fed downwardly, guided by the film guides 59 and the frames of the film will be successively exposed through aperture 58. Finally, the leading end of the film will pass below the lower end of the film guides and will thereafter be guided by the guide fingers 87 into close proximity with the take-up spool or roll 80. The take-up spool or roll is rotatably mounted on shaft 88 and also includes a cylindrical permanent magnet 89. Thus, the clip 82, made of magnetic material, provided at the leading end of the film strip will be attracted by the permanent magnet 89 and will be wound around the take-up spool.

Thus, the film strip will automatically be threaded through and fed by the feed mechanism and no manual threading of the film is required.

Figure 6:
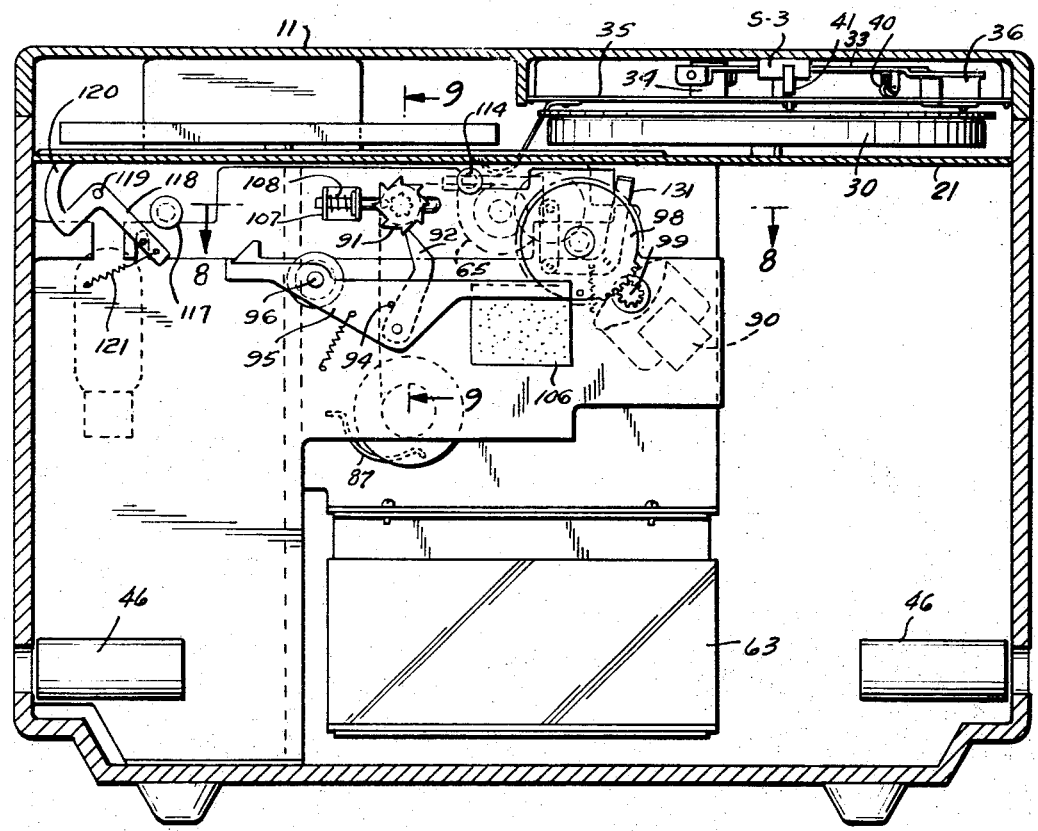
FIG. 6 is a sectional elevational view in the direction of the arrows on the line 6—6 of FIG. 4.

The film feeding and the film rewinding mechanism is operated by suitable means such as the induction motor shown at 90 in FIG. 6 and which is mounted on the chassis. In this connection, I provide suitable control means operated by cover 11 so that the motor may be operated by the pulse signal or manually to advance the film when the cover is closed and which connects the motor to the film rewinding means to cause the rewinding of the film when the cover is opened.

A portion of the film feeding means has been previously described and consists of the cylindrical magnet member 85, the gears or toothed wheels 86 and the film feeding sprockets 84, all mounted on shaft 83. Shaft 83 has an extension on the end of which ratchet 91 is mounted. Ratchet 91 is advanced step by step by pawl 92 which is normally resiliently pressed by spring 93 towards stop member 94. The assembly is mounted on lever 95, which in turn is pivoted on shaft 96 mounted on the chassis. Upon reciprocation of lever 95, the ratchet is rotated or advanced in a counter-clockwise direction, as viewed in FIG. 2a, upon each upward movement of pawl 92. The pawl is permitted to slide around the ratchet without rotating it on its downward stroke due to the provision of spring 93.

The reciprocation of pawl 92 and of lever 95 is caused by rotation of eccentric 97 mounted on gear 98 and which is caused to rotate in a clockwise direction by spur or pinion 99 mounted on the end of the shaft of motor 90. Gear 98 is mounted on shaft 128 supported on the chassis and is in constant engagement with pinion 99. Eccentric 97 engages flange 101 on lever 95 when lever 95 has been shifted to film feeding position by control member 100.

Extending downwardly from the end of lever 95 having flange 101 is the occluding lens or shutter 106 which may be made of an opaque material such as a metal or coated glass or of a light-transmitting material which will not transmit the projected image coming from the projector but will transmit light. Thus, the occluding lens or shutter may be made of a frosted glass which will disperse the light or of a lens which will dissipate the image rather than focus it on the screen.

Also mounted on control member 100, as by suitable bracket 107, is spring pressed detent 108 which engages between the teeth of pinion or gear 109 mounted on shaft 83 immediately adjacent ratchet 91. The spacing between the teeth of pinion 109 is such as to limit the rotation of shaft 83 to cause the advancing of the film strip one frame at a time. Detent 108 is shifted into engagement with pinion 109 when control member 100 is shifted longitudinally to the right to film feeding position. In this connection, it will be seen that shaft 83 extends through a slot 110 formed in the control member 100 so that the shaft, pinion and ratchet remain in relatively fixed position as the control member is shifted between film advancing position to the right and film rewinding position to the left.

The right hand end of lever 95 is shifted to elevated or film feeding position when the control member is shifted to film feeding position. Thus, it will be seen that the lower surface of the control member is formed with notch 111 which is engageable by the laterally projecting flange portion 112 formed on the end of lever 95.

In FIG. 2a, the control member 100 is shown in film feeding position and has been shifted to the right. Thus, flange 112 is disengaged from notch 111 and is in engagement with the lower surface of the control member pressing the flange downwardly and elevating the opposite end of the lever along with flange 101 and occluding lens 106. Simultaneously, detent 108 has been shifted into engagement with spacing pinion 109. The motor will cause gear 98 to rotate in a clockwise direction and eccentric 97 will rotate in a similar direction. Since the right hand end of lever 95 has been elevated, flange 101 is in the path of movement of eccentric 97 and the undersurface thereof will be engaged by the eccentric and elevated so as to elevate pawl 92 and cause it to rotate the ratchet 91 a sufficient distance to advance the film one frame. The accurate spacing of the advance is controlled by detent 108 in engagement with pinion 109.

When pawl 92 has been elevated sufficiently to advance the film one frame, lever 95 engages stop member 114 which is also mounted on the chassis. This engagement with the stop member stalls the operation of motor 90 and prevents further advancement of the film. While the motor is thus stalled with the right hand end of the lever in elevated position, occluding lens or shutter 106 is similarly in elevated or image-transmitting position so as to permit the transmission of the image from mirror 61 to mirror 62 beneath the shutter.

The motor 90 is energized and caused to operate when the photoelectric cells have been properly programmed by the light-transmitting portions of the film and when a pulse signal has been transmitted from the audio apparatus (when cover 11 has been previously closed).

Upon the termination of the pulse signal, the motor is deenergized and the right hand end of lever 95 reciprocates downwardly returning the parts to the position shown in FIG. 2a with occluding lens or shutter 106 in the lowered image occluding position so as to prevent the transmission of the image from mirror 61 to mirror 62, as indicated in FIG. 4.

Control member 100 is in the form of a metal plate supported for longitudinal shift movement on roller 115 mounted on the shaft of stop 114, roller 116 mounted on the pivot shaft 96 and roller 117 mounted on another shaft supported on the chassis.

The control member is caused to shift by lever 118 suitably pivoted to the chassis at 119 and having an upper end portion 120 which is engageable with the cover. When the cover is in open position, the upper portion 120 of the lever is caused to pivot upwardly by spring 121 connected between the opposite end of the lever and the chassis. When the mover is closed, the upper end of the lever is shifted downwardly to the position shown in FIG. 2a.

The lower end of lever 118 is provided with a pin 122 which engages in a slot 123 formed in the lower surface of slide 100. Thus, when the cover is closed and the lever is caused to pivot in a counter-clockwise direction, as viewed in FIG. 2a, control member 100 is shifted to the right to film feeding position. When the cover is opened, spring 121 causes lever 118 to rotate in a clockwise direction shifting control member 100 to the left to film rewinding position.

The film feeding mechanism also preferably includes a suitable connection between shaft 83 and shaft 88 supporting the take up roll. Thus, as shown in FIG. 2, I may provide a pulley 103 on the opposite end of shaft 83 from ratchet 91. Pulley 103 is connected by drive chain 102 to pulley 104 mounted on the end of the take up roll shaft. Also, as shown in FIG. 2, the right hand end of lever 95 may be connected to a spring 124 which, in turn, is connected at its opposite end to the chassis so as to assist the gravity in returning or lowering the right hand end of lever 95 when motor 90 is deenergized on the termination of the pulse signal.

The rewind mechanism includes the knurled wheel or roll at the end of the film cartridge. This knurled wheel or roll is shown at 125 in FIGS. 2, 3, 6 and 8. When the film cartridge is in proper position in the cartridge well 78, and the cover 11 has been opened, the knurled wheel or roll 125 is engaged by rotor 126 made of elastomeric material such as rubber.

The rotor 126 is in engagement with and is caused to rotate by knurled collar 127 formed on the shaft 128 which supports gear 98. Thus, motor 90, through pinion 99, gear 98, shaft 128, collar 127 and rotor 126, causes the rotation of the film spool so as to rewind the film. This operation takes place only after the cover 11 has been opened and control member 100 has been shifted to the left or film rewinding position as shown in FIG. 2b.

When control member 100 shifts to the left, detent 108 is shifted out of engagement with pinion 109 and flange 112 shifts into engagement with notch 111 so that the right hand end of lever 95 shifts downwardly with flange 101 out of the path of movement of eccentric 97.

The opening of the cover energizes motor 90 to cause the operation thereof so as to cause the continuous rotation of pinion 99, gear 98 and shaft 128.

Rotor 126 is mounted on the end of link 130 pivoted to bell crank 131 which, in turn, is pivotally mounted on the chassis by shaft or pin 132. The upper end of bell crank 131 is formed with a laterally projecting flange 133 in the path of movement of the outer end of control member 100.

When slide 100 is shifted to the right in the position shown in FIG. 2a, the bell crank is pivoted in a clockwise direction shifting link and rotor 126 upwardly out of engagement with the knurled collars 127 and 125. Thus, when the cover is closed, the rewind mechanism is disconnected and will not operate. When the cover is opened, control member 100 is shifted to the left out of engagement with flange 133 with the result that bell crank 131 rotates in a counter-clockwise direction under the action of spring 132 connected between the lower portion of the bell crank and the chassis. Thus, link 130 and rotor 126 are shifted downwardly into engagement with the knurled collars 125 and 127 causing the rotation and rewinding of the film spool.

The projection apparatus also includes an interlock system to prevent the operation thereof unless the film cartridge has been properly seated in the well. Thus, when the film cartridge is placed in well 78 (see FIGS. 5, 6, 7 and 8) cover 11 is opened with the result that rotor 126 has been shifted downwardly and blocks the seating of the film in the well due to interfering engagement of knurled collar 125 with the upper portion of rotor 126. As cover 11 is closed, rotor 126 is shifted upwardly by control member 100 so that it can move out of interfering engagement with knurled collar 125 formed on the end of the film cartridge. Simultaneously, the spring pressure member 135 mounted on cover 11 engages the top 66 of the film cartridge forcing it downwardly into fully seated position in the film well 78.

In the bottom of the film well, I provide a switch assembly shown at 136 in FIG. 7 which preferably comprises three switches, as will be described in greater detail in connection with the wiring diagram. These switches are normally open and are only closed when the film cartridge has been lowered into fully inserted position in the film cartridge well. Until the switches are closed, the circuit to projection lamp 53 and motor 90 are open. The result is that the projector cannot be operated until the film cartridge is fully inserted in the well.

The film rewinding mechanism serves to elevate or tilt the cartridge out of the well after the film has been fully rewound. Thus, as viewed in FIG. 7, the film cartridge is tilted upwardly in a clockwise direction with the left hand side of the cartridge as viewed in this figure raised slightly upwardly. This causes the switches in switch assembly 136 to open with the result that the operation of projection lamp 53 and of motor 90 is discontinued. The mechanism whereby the film cartridge is tilted out of the film cartridge well is as follows:

The rewind mechanism rotates film spool 70 in a clockwise direction, as viewed in FIGS. 3, 6, 7 and 8. When the clip 82 at the leading end of the film is drawn into engagement with the film cartridge 65 at the slotted opening 73, continued rotation of rotor 126 and of knurled collar 125 causes relative planetary motion of collar 125 on rotor 126 in a clockwise direction as viewed in FIG. 2b with the result that the film cartridge is tilted upwardly in a clockwise direction.

I also provide an interlock switch at the forward part of the casing which is actuated by the opening and closing of cover 11. Thus, in FIG. 5, I have shown a switch actuator 137 which closes the switch for causing the operation of motor 90 when cover 11 is opened when a film cartridge is fully seated in the film well. Thus, when cover 11 is opened, the film will be automatically rewound.

Thus, it will be seen that the projector mechanism has a number of important features. The film is advanced a single frame at a time by motor 90 when control member 100 is shifted to film feeding position and simultaneously the occluding lens is shifted to transmit the image.

The apparatus includes a film interlock which prevents the operation of the projector unless the film cartridge is in proper position. It also includes an automatic rewind system which rewinds the film when the cover of the casing is open. In this connection, the rewinding operation automatically ceases and the projector is shut off when the film has been fully rewound on the spool.

It will thus be seen that I have provided improved apparatus usable as an audio aid or as a visual aid or as a combined audio-visual aid to education. Thus, the audio apparatus may be played alone. It has a number of advantages over audio apparatus heretofore available. Thus, the tone arm automatically resets itself to its initial playing position. In addition, I provide an automatic interlock which prevents the operation of the apparatus if a record is not in place on the turntable. I may also utilize signals from the record to control the operation of the audio apparatus or to control the operation of other apparatus such as the projection mechanism.

I also provide improved projection mechanism which may be operated alone or in combination with the audio apparatus. When operated with the audio apparatus, its operation may be controlled by signals transmitted from the audio apparatus thereby coordinating the operation of the two mechanisms. Also, when the photo cells are properly programmed, the projection apparatus can be manually operated. In addition, I have provided improved controls with the projection mechanism which prevent the operation of the apparatus when a film cartridge is not in place and which automatically rewinds the film when the cover is opened.

I also provide controls whereby responses may be made to data or materials presented by the audio or visual apparatus. Thus, the responses may be recorded or they may simply be orally recited, or they may be written, or responses to multiple choice questions may be made by selecting the proper button.

In order to provide for flexibility of control of my mechanism, I preferably provide light-sensitive elements which operate in cooperation with the projection lamp and light-shielding tracks on the film strip. Thus, as shown primarily in FIGS. 2, 9, 10 and 12, I provide four photoelectric cells PC-3, PC-4, PC-5 and PC-6.

As shown in FIG. 12, these photoelectric cells are connected in circuit with the various relays of the system and help to control the operation of the system. They are physically located on the opposite side of the film guides from the projector lamp 53. Thus, in operation of the projection apparatus, the film is interposed between the projection lamp and the photoelectric cells.

Figure 10:
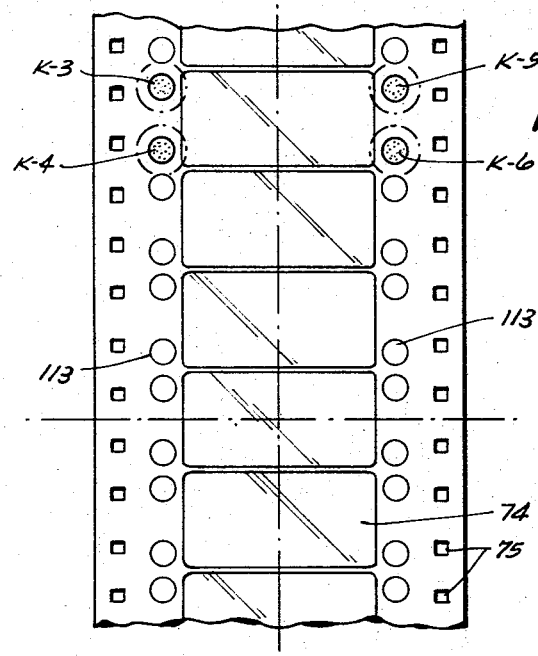
FIG. 10 is a fragmentary sectional view showing a portion of a film strip and also indicating the location of the photo-electric cells and the relative arrangement of the light-shielding track.

As shown most clearly in FIG. 10, I provide the film with light-shielding tracks 113 adjacent the sprocket opening therein and presenting light-transmitting zones and opaque zones whereby the energization of the photoelectric cells is directly controlled by the film strips.

I may utilize the light from the projection lamp for operating the photoelectric cells. However, I prefer to employ a separate light source for the operation of the photoelectric cells. For this purpose, I may use one or more neon lamps or incandescent lamps.

In FIGS. 2c and 7, I have indicated such a separate light source in the form of a lamp 139 located on the same side of the film guide as the projector lamp. The light from the lamp may be reflected directly against the light-shielding tracks 113 and the photoelectric cells by a suitable reflector or, as shown, I may employ a prism 140 having a clear upper surface against which the light of the lamp is directed and a reflecting lower surface which directs the light outwardly through clear lens portions 141 facing towards the light-shielding tracks 113 of the film. In FIG. 12, I have shown two neon lamps.

As shown from the circuit diagram of FIG. 12, the photoelectric cells may be utilized to enable the separate operation of the audio or visual mechanism or the combined operation of the audio and visual mechanism. They may also be utilized to control other operations such as the responses to the multiple choice questions.

*Electrical circuits and operation*

We will now consider in further detail the circuitry shown in the wiring diagram, FIG. 12, in connection with the various methods in which the apparatus may be operated.

The main power supply is shown as coming through plug P–1. One side of the power line is shown as leading to point X, and this point represents one side of the 115 volt AC line, i.e. the grounded side. Every other point marked X in the wiring diagram is connected to this point. The same side of the wiring diagram is connected through rectifier 146 to point XX which represents one side of the 115 volt DC line, and every other point in the wiring diagram labeled XX is connected to this point.

The other side of the power supply through P–1 leads through line fuse F–1 and main power switch S–1 to the point Y which represents the other or hot side of the 115 volt AC supply line, and every other point in the diagram marked Y is connected thereto. It will be seen that both the point X and the point Y are connected by lines 147 and 148 to the primary windings of transformers T–1 and T–2.

The secondary winding of transformer T–1 is connected to points Z and ZZ and the other points in the diagram bear the labels Z and ZZ respectively are connected to these points. The secondary winding of transformer T–2 is connected through rectifier 149 to audio and pulse amplifiers 44 and 45.

The side Y of the main power supply line is also connected to a contact of switch S–10 which is a mode switch for energizing the light source or exciter lamps 139'. The exciter lamps 139' are similar in function to the light source 139 shown in FIG. 2c, namely they serve as the light source for the photoelectric cells PC–3 through PC–6 and are disposed on the opposite side of the light shielding tracks 118 from the photo cells. In this instance, the light sources are neon lamps and a separate one is provided for each light shielding track. It will be noted that the opposite side of the neon tubes is connected to side X of the power supply. Thus, the lamps are energized when mode switch S–10 is closed.

Side Y of the power supply is also connected to switch S–11 through line 150. Switch S–11 is the interlock switch which is controlled by the interlock mechanism 137 shown in FIG. 5 which is operated when the cover 11 is closed and opened.

In FIG. 12 the switch S–11 is shown in the position it assumes when the cover is open and it is then connected through line 151 to contact pins 9 of photoelectric cell relays K–4, K–5 and K–6. When the cover is closed, switch S–11 is shifted to engage the other contact and then is connected by line 152 to contact pin B of interlock switch 136.

Interlock switch 136, it will be recalled, is located in the cartridge well and has three separate switch elements shown at A, B and C, all of which are closed when a cartridge is properly seated in the well and all of which are opened when the cartridge is not properly seated.

The second point of switch S–11 is also connected to line YY and every other point in the circuit designated by the letters YY is connected thereto. In this connection, the points Y and YY represent the hot side of the AC line and also the return side of the DC line.

The starting switch which is operated by button 16 is shown at the upper left hand corner of the diagram at S–2. The switch is shown in its normally open position. The one contact pin is connected to line YY. The other side of the switch is connected through contact pin 4 or relay switch SK–2 to the relay winding. The relay is a direct current relay and the opposite side thereof is connected to line XX.

It will also be seen that the circuit includes switches and associated switch relays S–5 and SK–5, S–6, SK–6, S–7 and SK–7 and S—8 and SK–8.

The switches S–5 through S–8 are operated respectively by the buttons A, B, C and D appearing on the front of the casing. One side of each of these switches is connected to the relay winding and thence to direct current line XX. These switches are normally open, and the other side of each of the switches is connected by line 152 to line 153, which, in turn, is connected to contact point 6 of switch relay SK–9.

Switch S–9 of this relay is connected at one side to the winding thereof, which, in turn, is connected at its opposite side to direct current line XX. The opposite side of switch S–9 is connected by line 153 to contact pin 5 of relay K–2. Switch S–9 is the recording switch that is operated by button 17 on the front of the casing.

The relay is shown in its deenergized position. When the relay is energized, contacts 6 and 7 are closed, contacts 9 and 10 are closed, contacts 12 and 13 are closed and contacts 15 and 16 are closed. Thus, capstan motor 25, tape head 24 and microphone 28 are energized.

In addition, it will be seen that the low voltage circuit Z-ZZ is completed through contacts 9 and 10 of relay SK–9 which operates tape recording light 145 for indicating that the recorder is operating.

With regard to relay K–2, it will be seen that one side of the winding thereof is connected to direct current line XX. The other side is ocnnected through line 154 to one side of record sensing switch S–3.

It will be recalled that record sensing switch S–3 remains open unless the record is in place. The other side of record sensing switch S–3 is connected by line 155 to contact pin 9 of photoelectric cell relay K–3, which, in turn, is connected to contact pin 8 when the relay is in its dark or deenergized condition. Contact pin 8 is connected by line 156 to contact pin 10 of SK–2.

It will be seen that when switch S–2 is closed by pushing button 16 so as to energize relay SK–2, contact pin 10 connects to contact pin 9, thereby completing the circuit to direct current return line YY.

The motor 32 for operating the turntable of the phonograph is shown at the lower left hand part of the wiring diagram. It is connected on one side to ground line X. The other side of the motor is connected by line 157 to contact pin 7 of relay K–2. When relay K–2 is energized, contact pin 6 is connected to contact pin 7 so as to complete the circuit of phonograph motor 32 to line YY.

The circuit also includes relays K–1 and K–7. One side of the winding of relay K–1 is connected to direct current line XX. The other side is connected by line 158 to contact point 11 of relay SK–9. When relay SK–9 is in its normal deenergized position, contact pin 11 is connected to contact pin 12, which, in turn, is connected by line 159 to the output of pulse amplifier 45.

The input of the pulse amplifier 45 is connected by line 160 to contact pin 15 of relay SK–9, which, in turn, is normally connected to contact pin 14 of the relay when it is deenergized. Contact pin 14 of relay SK–9 is connected by line 161 to channel B of the phonograph pickup cartridge 36.

Channel A of the phonograph pickup cartridge is connected to the input of audio amplifier 44 by line 161.

The output of the audio amplifier is connected to loudspeaker 43 and to jacks 46.

The circuit also includes relay K–7 whose winding is connected at one side to direct current line XX and at the other side is connected by line 181 to line 155.

In addition to the foregoing, the circuit includes an error indicating light 164 which is connected at one side to low voltage line ZZ and at the other side is connected by line 165 to contact pin 10 of photoelectric relay SK–8. When photoelectric relay SK–8 is energized, it will be seen that contact pin 10 is connected to contact pin 9, which, in turn, is connected by line 166 to the other side Z of the low voltage line from transformer T–1.

Audio operation

For audio operation without the operation of the projector, a record is placed on the turntable and the cover is closed so as to close record sensing switch S–3 and lid operated switch S–11. Main power supply switch S–1 is closed so as to energize transformer T–2 and the amplifiers 44 and 45.

Mode switch S–10 is left open. To initiate the operation of the record, button 16 is pressed so as to momentarily operate switch S–2, energizing relay SK–2 and closing the circuit between contact pins 9 and 10. Thus, line YY is connected through contact pins 9 and 10 of relay SK–2 to line 156, which, in turn, is connected to contact pin 8 of photoelectric relay K–3.

Since mode switch S–10 is open and the exciter lamps are dark, relay K–3 is deenergized with the result that contact pin 8 is in engagement with contact pin 9.

It will be recalled that contact pin 9 is connected through line 155 to sensing switch S–3, which, in turn, is connected through line 154 to the winding of relay K–2. Thus, relay K–2 is energized and contact 6 shifts into engagement with contact 7 and contact 9 shifts into engagement with contact 10. Due to the fact that contact 9 is connected to line YY, the circuit of relay K–2 is latched in and will remain energized even after switch S–2 is open. Thus, the circuit of phonograph motor 32 is completed through line YY, contacts 6 and 7 and line 157.

In the illustrated embodiment, the record disc being played is a two-channel record disc, but it should be understood that other types of recordings may be used such as a tape recording or a tape contained in a cartridge, or a single-channel record disc with a high or low frequency pulse signal which might utilize a multiplexing system. Under certain circumstances, different portions of the same tape or record may be utilized for providing audio instructions and for recording responses.

While the record is playing, the student listens and at intervals makes responses as requested by the recording. If the responses are brief, the record will continue to play. When the responses are lengthy, the recording will stop itself as a result of a pulse signal from channel B of the record. During a prolonged stop, the student might make written responses on work sheets or oral responses to the recorder. In order to record a response, the student actuates the recording button 7 which closes switch S–9 and maintains the button depressed while he speaks into the microphone.

I have previously pointed out that when switch S–9 is closed, relay SK–9 is energized actuating the tape motor, the recording head and the microphone, as well as the recording indicating light 145.

As indicated, when a long response is called for, the pulse signal from the record will cause the phonograph to stop playing. Thus, the pulse from channel B is transmitted along line 161, contacts 14 and 15 and line 160 to amplifier 45. The amplified signal is then transmitted along line 159 through contacts 11 and 12 and along line 158 to relay K–1 so as to energize the relay and connect direct current line XX through contacts 10 and 9 and line 162 to contact 6 of relay SK–2. Contact 6, in turn, is connected through contact 5 to line 163, which, in turn, is connected to contact 5 of photoelectric relay K–3.

Since photo cell PC–3 is dark, relay K–3 is deenergized with the result that contact 5 is connected to contact 6, which, in turn, is connected by line 154 to the relay coil of relay K–2, thereby shorting it out and deenergizing it. Relay K–2 will remain deenergized for as long as the pulse signal continues. While relay K–2 is deenergized, the connection between contact pins 6 and 7 will open, thereby breaking the circuit phonograph motor 32 and causing it to shut off.

The phonograph motor can be restarted simply by pressing the button 16 to actuate switch S–2. When switch S–2 is actuated, the starting routine described above will be re-enacted.

Visual only

Where it is desired to operate the projector only and to omit the audio apparatus, then no record is played on the turntable of the phonograph, with the result that sensing switch S–3 remains open, as shown in FIG. 12, and the circuit to the phonograph motor is accordingly open.

A film cartridge is placed in the film well so as to close the triple switch 136 and the cover is closed so as to shift cover interlock switch S–11 into engagement with the lower contact, as seen in FIG. 12. The main power switch S–1 is then closed and mode switch S–10 is also closed so as to energize the photo cell exciter lamps 139′.

The circuitry is then in condition for operation of the projector. Also, since the cover of the casing is closed, control member 100 will be shifted to film feeding position, as shown in FIG. 2a. Thus, when induction motor 90 is energized, the film will be advanced one frame at a time. The circuitry is such that the induction motor is energized when relay K–7 is de-energized and relay K–4 is energized. This condition can be brought about by pressing and releasing the button 16 at the front of the casing so as to momentarily close the switch S–2.

When switch S–2 is closed, the following conditions exist: line YY is connected through contact pins 9 and 10 of relay SK–2 to line 156 and thence through contacts 8 and 9 of de-energized relay K–3 through line 155 to the winding of relay K–7 so as to energize the relay and open the connection betwen contact pins 8 and 9 of relay 2–7. When the circuit is in this condition, no current flows to induction motor 90.

When switch S–2 opens, relay SK–2 is de-energized and in that condition current flows from line YY through contact pins 9 and 8 of relay SK–2, line 170 to contact pin 6 of photo cell relay K–4. This relay is energized due to the fact that the shielding track on the film permits light from the exciter lamp to be directed on photo cell PC–4. The result is that current flows from contact pin 6 to contact pin 7 of relay K–4, thence through line 169 and contact pins 8 and 9 of de-energized relay K–7, and thence through line 168 through switch sections C and A of multiple switch 136 to induction motor 90. Since the opposite side of the induction motor is connected to line X, it is apparent that the motor will be energized so that lever arm 95 wil shift upwardly to cause pawl 93 and ratchet 91 to advance the film for one frame. Simultaneously, the occluding lens 106 is shifted out of the path of the projected image so that the image of the next frame will be projected upon the screen. Whenever it is desired to again advance the film one frame, the process of closing and opening switch S–2 is repeated.

Audio and visual operation

For combined audio and visual operation, a film cartridge is placed in the cartridge well and a record disc is placed on the turntable. Thus, when cover 11 of the casing is closed, the record sensing switch S–3 will close and the multiple switch 136 will also close. Thereafter, main power switch S–1 is closed and mode switch S–10 is also closed, so as to establish the circuit conditions heretofore described.

During the first few frames of the film, the light shielding track is such that photoelectric cell PC–3 will remain in dark condition so that relay K–3 is de-energized and photoelectric cell PC–4 has light directed thereon so as to energize relay K–4. During this condition, the film can be advanced one frame at a time, as described above, by repeatedly pressing button 16 so as to close and open switch S–2. When a number of frames have thus been advanced, the programming of the photoelectric cells changes, and the light shielding tracks block off the light to photoelectric cell PC–4 so as to de-energize relay K–4 and light is directed on photo cell PC–3 so as to energize relay K–3.

When the circuitry is in this condition, the film can no longer be advanced by closing and opening switch S–2 and thereafter the film is advanced by pulse signals from channel B of the record disc.

The amplified pulse signal from amplifier 45 is transmitted through line 159 and contacts 12 and 11 of de-energized relay SK–9 and thence through line 158 to the coil of relay K–1. Thus, relay K–1 is energized and contact pins 6 and 7 of this relay are connected together so that line YY is connected through line 169, contact pins 8 and 9 of de-energized relay K–7 and line 168 through switch sections C and A of multiple switch 136 to induction motor 90. The opposite side of the motor is connected to line X and thus the circuit to the motor is completed.

Since controller member 100 is in film feeding position, as shown in FIG. 2a, the energization of the motor causes the film to advance one frame, and the occluding lens is shifted out of the path of the image so that the image is projected on the screen. The image is projected throughout the duration of the pulse. When the pulse signal ceases, relay K–1 is de-energized with the result that the circuit to motor 90 is opened. Lever 95 and occluding lens 106 then drop downwardly into the path of the image from the projector. The apparatus is then in condition for further advancement of the film when another pulse signal is received.

The photo cells may also be programmed so that during the audio visual operation the phonograph is automatically interrupted by a pulse signal from channel B so as to permit either the writing or the recording of a written response. For this purpose, the light shielding track on the film shields photo cell PC–3 so that it is dark and relay K–3 is de-energized and directs light on photo cell PC–4 so as to energize relay K–4. It will be recalled that when the photo cells are thus programmed a pulse signal from channel B of the record will not advance the film and the film can only be advanced under these conditions by closing and opening switch S–2. It will also be recalled that a pulse signal from channel B causes de-energization of the phonograph motor due to the fact that relay coil K–2 is shorted out and de-energized as a result of the pulse signal.

When this occurs, a written response can be prepared. When it is desired to restart the phonograph, button 16 is momentarily pressed so as to close switch S–2, which results in the starting of the phonograph motor and also in advancing the film for one frame.

If it is preferred to record the response, rather than to prepare a written response, then when the phonograph motor has been de-energized switch S–9 is closed by pressing recording button 17 on the front of the casing. In this connection, the button 17 must be pressed throughout the period that it is desired to record the response. When switch S–9 is closed, relay SK–9 is energized, with the result that the circuit of tape motor 25 is completed through contacts 7 and 6 of relay SK–9, line 175 and contact pins 5 and 6 of de-energized relay K–2 and thence to line YY. Microphone 28 is connected through contact pins 16 and 15 of relay SK–9 and line 160 to amplifier 45. The amplified response is then returned through line 159 to contact pin 12 of relay SK–9 and thence through contact pin 13 to tape recording head 24.

Button 17 is pressed throughout the recording operation. When the response has been completed, button 17 is released. To reinitiate the operation of the audio system and to advance the film one frame, button 16 is again pressed to momentarily close switch S–2.

As previously indicated, the apparatus may be programmed so as to present multiple choice questions which may be answered by pressing any one of buttons A, B, C or D. These buttons cause the operation of switches S–5, S–6, S–7 or S–8. In this operation, the photo cells are programmed by the light shielding tracks so that photo cell PC–3 is dark and relay K–3 de-energized and photo cell PC–4 is light and relay K–4 is energized.

When the circuitry is thus arranged, it will be recalled that a pulse signal from channel B causes the phonograph record to stop. It will also be recalled that if relay K–7 is energized and then de-energized while relay K–4 is energized that the circuit to induction motor 90 will be interrupted to permit lever 95 to move downwardly and then re-energized so as to move the lever upwardly and advance the film one frame.

Photo cells PC–5 and PC–6 may be programmed so that both photo cells are light or both photo cells are dark or either PC–5 or PC–6 is light while the other is dark. Thus, the apparatus may be programmed so that any one of the buttons will give the correct answer.

In the situation where both PC–5 and PC–6 are dark then the correct answer is given by pressing button B which actuates switch S–6.

With this arrangement, the phonograph record can present a problem or question subject to four possible answers A, B, C or D. When the problem is presented, either audibly or visually by means of the projector or by the combination of both, then a pulse signal from channel B of the record interrupts the operation of the record in the manner previously described by shorting out relay K–2.

Assuming now, as stated above, that button B is the proper response, then the actuation of button B closes switch S–6, which in turn causes the energization of relay K–7 by the following: line YY is connected through contact pins 6 and 5 of relay K–2 to line 178. Line 178 is connected through contact pins 6 and 5 of de-energized relay K–6 to line 179, which in turn is connected to pin 6 of energized relay SK–6. The circuit is then completed through line 180, contact pins 5 and 6 of de-energized relay K–5 and lines 181 and 162 to the winding of relay K–7.

Thus, upon the pressing of button B and closing of switch S–6, relay K–7 is momentarily energized to break the connection between contacts 8 and 9 of relay K–7, thereby interrupting the circuit to induction motor 90. When the circuit is interrupted, lever 95 and occluding lens 106 can fall downwardly. Then when relay K–7 is again de-energized and contact pins 8 and 9 are connected together, the circuit to motor 90 is re-established and the lever 95 and the occluding lens are shifted upwardly to advance the film one frame.

When the incorrect button is pressed, error lamp 164 is lighted and the film is not advanced. Thus, under the assumed conditions set forth above with both photo cell PC–5 and photo cell PC–6 being in dark condition, the selection of response D so as to actuate switch S–8 would be incorrect. Closing of switch S–8 energizes relay SK–8, thereby connecting contact pin 9 with contact pin 10 and completing the circuit to error lamp 164. The circuit of relay K–7 remains de-energized, and accordingly the film is not advanced. Thus, the incorrect answer is clearly shown by the error light and the failure of the film to advance.

When it is desired to rewind the film, it is only necessary to raise the cover with the result that lid switch S–11 will be shifted upwardly to the position shown in FIG. 12. The circuit to induction motor 90 will then be completed through line Y, switch 11, lines 151, 185, 186, contact pins 9 and 10 of energized relay K-5 and thence through switch sections C and A of multiple switch 136. Since control member 100 is in film rewinding position, the motor will then serve to rewind the film.

When the film is fully rewound, it will be tilted upwardly in the manner previously described so as to open switch 136, thereby breaking the circuit to motor 90. It will thus be seen that I have provided improved audio visual apparatus which accomplishes the several objects set forth at the beginning of this specification.

Modifications may be made in the illustrated and described embodiment of this invention without departing from the invention as set forth in the accompanying claims.

I claim:

1. An audio-visual apparatus for use as an instructional aid comprising in combination: an electrically operated sound reproducing mechanism for reproducing the sound from a multi-channel recording one channel of which carries audible sound modulations and a second channel of which carries inaudible signal modulations, said sound reproducing mechanism including a pick-up head for each channel and a first amplifier for amplifying sound from the audible channel and a second amplifier for amplifying the inaudible signal modulations from the other channel, said recording being in the form of a record disk which may suitably be mounted on a turntable that is controllably driven by an electric motor when a record is in place so that a tone arm having a pick-up head and a record engaging stylus mounted adjacent said turntable is adapted upon rotation to track the grooves of said record disk from the initial playing position to the final playing position whereby said sound is reproduced; an electrically operated projection mechanism for projecting images from a multi-frame film strip to a screen and including at least one light source for illuminating said strip, a film support having an aperture and feed means for advancing the film strip one frame at a time and exposing an individual frame of said film at said aperture and an occluding shutter shiftable between an image-occluding position in which the image is occluded from said screen and an image-exposing position in which the projected image is exposed to said screen and view; and electrically operated means in the form of electrical circuitry interconnected between the second amplifier of the sound reproduction mechanism and the feed means and occluding shutter of the projection mechanism so as to control the operation of the feed means and occluding shutter and causes advance of the film and exposure of the image to view in response to signals from the second channel of the sound recording.

2. The audio-visual apparatus of claim 1 wherein said film strip carries a light shielding track including light passing and light opaque zones, a light sensitive element positioned on the side of said film support opposed to said light source so as to vary the electric circuit control in response to variations in the light shielding track on said film.

3. The audio-visual apparatus of claim 1 further comprising control means for affecting the operation of said sound reproducing and projection mechanisms and including electrical circuitry connected to said mechanisms and controlling the operation thereof, the light shielding track on said film strip, and said control means including a light sensitive element positioned on the opposite side of said film support from the light source so as to vary the control in response to variations in a light shielding track on the film.

4. The audio-visual apparatus of claim 1 further comprising electrically operated response mechanism including a plurality of switches for indicating different responses to materials produced by the sound reproducing and projection mechanisms, and means for indicating whether the responses are correct.

5. The audio-visual apparatus of claim 4 further comprising electrically operated recording mechanism for recording additional responses.

6. The audio-visual apparatus of claim 1 further comprising a lens system in alignment with the light source and aperture for directing a beam of light from the light source through the aperture and for focusing an image from the film frame positioned in said aperture on said screen.

7. The audio-visual apparatus of claim 6 wherein said occluding shutter has a light diffusing portion for diffusing the light in said beam and preventing the formation of an image while transmitting diffused light therethrough, said shutter normally positioned in an image occluding position yet shiftable to an image transmitting position, and means for operating the film advancing means to cause it to advance the film a single frame and to shift the occluding lens to the image transmitting position.

8. Audio apparatus comprising a casing having a cover portion movable between open and closed positions, a turntable for receiving a disk recording mounted for rotary motion within said casing, means including an electric motor and electric circuit for causing the operation of said turntable, and automatic control means for preventing the operation of said motor when a record is not in position on the turntable including a switch member for said electric circuit, said switch member mounted within said cover and upon closure of the latter being engageable with the record disk on turntable to close the switch and complete the circuit of the electric motor when a record disc is in position on the turntable and to maintain the circuit in open position when a record disk is not in position on turntable.

9. Audio apparatus comprising a casing, a turntable for receiving a disk recording mounted for rotation in said casing, means including an electric motor and electric circuit for causing the operation of said turntable, a tone-arm having a pick-up head and stylus engageable with a record disk on the turntable, a cover assembly for said casing shiftable between open and closed positions above said turntable, and a switch member for said electric circuit supported by said cover assembly and engageable with a record on the turntable when the cover assembly is closed and a record disk is in position on said turntable so as to close the switch and complete the circuit of said motor and so as to maintain the circuit in open position when a record disk is not in position on said turntable.

10. Audio apparatus comprising a casing, a turntable for receiving a disk recording mounted for rotation in said casing, a cover assembly for said casing pivotally mounted along one edge to one side of the casing and pivotally shiftable between open and closed positions above said turntable, a tone-arm having a pick-up head and stylus adjacent one end for engagement with a record disk on said turntable and pivotally mounted adjacent its other end on said cover assembly so that the pick-up head and stylus can track a record groove of a record disk from the initial playing position to the final playing position, said pivotal mounting of the tone-arm being positioned relatively close to the pivotal mounting of the cover assembly than the pick-up head and stylus, a pair of stop members fixedly mounted on said cover assembly in spaced relationship and engageable with opposite sides of said tone-arm so as to engage the tone-arm and prevent movement thereof beyond said initial and final playing positions whereby when said tone-arm has shifted away from said initial playing position and the cover is raised the tone-arm will automatically shift under the force of gravity to said initial playing position, and a switch member mounted in said cover and engageable upon closing with said disk recording for completing an electric circuit to provide turntable rotation.

(References on following page)

References Cited

UNITED STATES PATENTS

| | | | |
|---|---|---|---|
| 2,512,724 | 6/1950 | Like | 352—32 |
| 2,552,757 | 5/1951 | Adler et al. | 274—2 |
| 2,640,700 | 6/1953 | Mortimer | 274—2 |
| 3,028,790 | 4/1962 | Wade et al. | 88—28 |
| 3,110,216 | 11/1963 | Chalfin | 88—28 |
| 3,187,626 | 6/1965 | Mindell et al. | 88—28 |
| 3,252,372 | 5/1966 | Gallina | 88—28 |

NORTON ANSHER, *Primary Examiner.*

RICHARD M. SHEER, *Assistant Examiner.*